United States Patent
Hoch et al.

[11] Patent Number: 6,103,786
[45] Date of Patent: Aug. 15, 2000

[54] PROCESS FOR PREPARING STABLE, FINELY DIVIDED POLYMER DISPERSIONS

[75] Inventors: Martin Hoch, Solingen; Rainer Elbert; Bernd Klinksiek, both of Bergisch Gladbach, all of Germany

[73] Assignee: Bayer Aktiengesellschaft, Germany

[21] Appl. No.: 09/028,941

[22] Filed: Feb. 24, 1998

[30] Foreign Application Priority Data

Mar. 3, 1997 [DE] Germany .................. 197 08 606

[51] Int. Cl.$^7$ .................. C08J 3/00; C08F 2/32; C07C 41/40
[52] U.S. Cl. .................. 523/336; 516/925; 516/58; 516/53; 526/932; 524/801
[58] Field of Search ................ 516/53, 58, 925; 526/932; 523/336; 524/801

[56] References Cited

U.S. PATENT DOCUMENTS

| | | |
|---|---|---|
| 2,944,038 | 7/1960 | Hunter et al. . |
| 3,062,767 | 11/1962 | Hunter et al. . |
| 3,892,703 | 7/1975 | Burke, Jr. . |
| 3,998,772 | 12/1976 | Beerbower et al. . |
| 4,070,325 | 1/1978 | Burke, Jr. . |
| 4,177,177 | 12/1979 | Vanderhoff et al. ............ 260/29.2 M |
| 4,243,566 | 1/1981 | Burke, Jr. ...................... 260/29.6 R |
| 4,349,455 | 9/1982 | Yamamura et al. ................ 252/312 |
| 5,554,726 | 9/1996 | Araki et al. ...................... 528/495 |

FOREIGN PATENT DOCUMENTS

| | | |
|---|---|---|
| 101007 | 2/1984 | European Pat. Off. . |
| 339559 | 11/1989 | European Pat. Off. . |
| 384165 | 8/1990 | European Pat. Off. . |
| 685544 | 12/1995 | European Pat. Off. . |
| 805171 | 11/1997 | European Pat. Off. . |
| 1965934 | 6/1971 | Germany . |
| 1055820 | 1/1964 | United Kingdom . |
| WO 9514729 | 6/1995 | WIPO . |

OTHER PUBLICATIONS

"Colloid & Polymer Science" SCI 267:1113–1116 (1989).

*Primary Examiner*—Cynthia Harris
*Assistant Examiner*—Monique T. Cole
*Attorney, Agent, or Firm*—Connolly Bove Lodge & Hutz

[57] ABSTRACT

Stable polymer dispersions with polymer particle sizes of 0.1 to 10 $\mu$m are prepared by dissolving a water-in-oil emulsion, comprising a polymer dissolved in an organic solvent which is immiscible with water (organic phase) and an aqueous phase, wherein the viscosity of the organic phase is 1.0 to 20,000 mPas (measured at 25° C.), the surface tension between organic and aqueous phase is 0.01 to 30 mN/m, the particle size of the water emulsified in the organic phase is 0.2 to 50 $\mu$m and the ratio by volume of organic phase to aqueous phase is in the range 80:20 to 20:80, subjecting this emulsion to a shear process at a shear power of $1\times10^3$ to $1\times10^8$ Watts per cm$^3$, wherein the water-in-oil emulsion is converted into an oil-in-water emulsion.

3 Claims, 4 Drawing Sheets

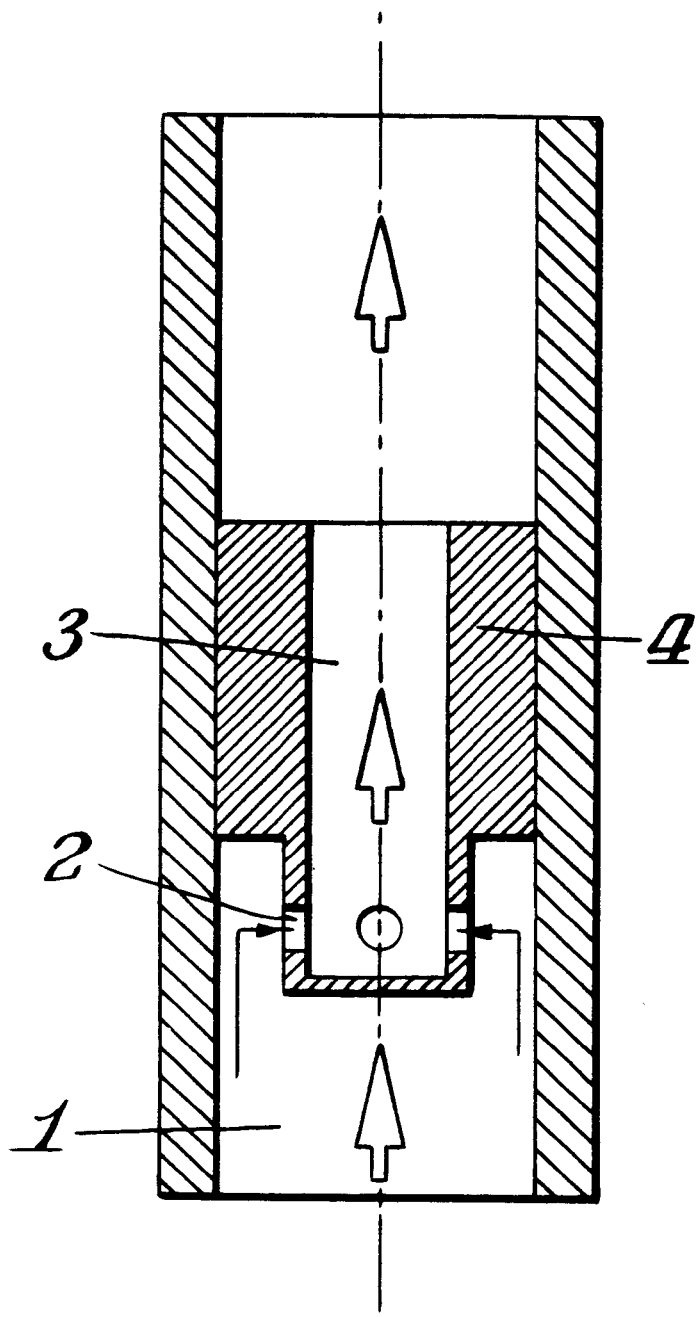

PROCESS FOR PREPARING STABLE, FINELY DIVIDED POLYMER DISPERSIONS

The present invention relates to a process for preparing stable, finely divided polymer dispersions and the use of polymer dispersions prepared by the process according to the invention for producing dipped articles, coated articles and adhesives.

Emulsions of polymer solutions, in particular elastomer solutions, in aqueous emulsifier solutions are known in principle and are described for example in U.S. Pat. No. 3,226,349, U.S. Pat. No. 2,944,038, U.S. Pat. No. 3,062,767, U.S. Pat. No. 4,243,566, U.S. Pat. No. 4,070,325, U.S. Pat. No. 3,892,703, U.S. Pat. No. 3,998,772, U.S. Pat. No. 4,177,177, EP-A 0 339 559, DE-A 1 965 934 and WO 95/14729. Emulsifying processes, moreover, are described in J. Polym. Sci. C, 16 (1967) 2814 and in Ann. Meet. Proc. Inst. Synth. Rubber Prod. 16 (1975), 5.

According to a known process, the polymer dispersion or emulsion is conventionally prepared in such a way that a polymer solution as organic phase is placed in contact with an aqueous phase while using high shear power. Emulsifiers or emulsifier mixtures are usually added with further auxiliary agents either in the aqueous phase only or in both phases, in order to improve the emulsifying effect. A wide variety of different units are used for the shear-induced dispersion of the organic polymer-containing phase in the aqueous phase (oil-in-water emulsion), such as high-pressure (gap) homogenisers (e.g. from the APV Schröder Co.), ultrasonic dispersers, Ultra-Terrax, Kotthoff mixing sirens, dissolver discs, colloid mills and a wide variety of designs of various nozzles. When selecting and comparing dispersion equipment for preparing dispersions, reference may be made to literature known to the specialist in the field, e.g. P. Walstra, Formation of Emulsions, in: P. Becher, Encyclopedia of Emulsion Technology, vol. 1, New York, Basle 1983. All agree that selection of the dispersion machine depends on the volume-specific power. To produce finely divided emulsions (<1 $\mu$m) dispersion machines with high volume-specific powers are required, such as, for instance the high-pressure homogenisers mentioned above. Such finely divided emulsions can barely be produced at all using machines operating on the rotor/stator principle.

The shearing units used may be connected in series or several passes may be made through one unit.

In the known process, the solvent is removed by stripping, pressure reduction (flashing) or by some other distillative process. Furthermore, the relatively low concentration emulsions (thin latex) may be brought up to the final concentration required by distilling, centrifuging or by creaming.

The disadvantage of the known process for preparing polymer dispersions is in particular that very high shear powers have to be applied in order to obtain stable emulsions at all. In addition, large-scale performance of the known process for preparing polymer dispersions requires complicated equipment and is energy intensive. Furthermore, it is a disadvantage that large amounts of emulsifiers are required in order to obtain stable emulsions when using the known process. For further use of the polymer dispersions, large amounts of emulsifiers then have to be removed because these may have an adverse effect on the properties of the products produced from the polymer dispersions.

There is thus the object of providing a simple process for preparing polymer dispersions which avoids the disadvantages of the prior art described above. In addition, the process according to the invention should ensure that stable polymer dispersions which have specific, defined polymer particle diameters are always obtained.

The invention therefore provides a process for preparing stable polymer dispersions with polymer particle sizes of 0.1 to 10 $\mu$m [$d_{50}$ determined in an ultra-centrifuge], which is characterised in that a water-in-oil emulsion, comprising a polymer dissolved in an organic solvent which is immiscible with water (organic phase) and an aqueous phase, wherein the viscosity of the organic phase is 1.0 to 20,000 mPas (measured at 25° C.), the surface tension between organic and aqueous phase is 0.01 to 30 mN/m, the particle size of the water emulsified in the organic phase is 0.2 to 50 $\mu$m and the ratio by volume of organic phase to aqueous phase is in the range 80:20 to 20:80, is subjected to a shear process at a shear power of $1\times10^3$ to $1\times10^8$ Watts per cm$^3$, wherein the water-in-oil emulsion is converted into an oil-in-water emulsion.

The stable polymer dispersions prepared by the process according to the invention preferably have a polymer particle size of 0.1 to 50 $\mu$m, in particular 0.1 to 2.0 $\mu$m. The particle size is determined using an ultracentrifuge as described in J. Coll. Polym. Sci., 267 (1989) 1113.

The viscosity of the organic phase in the water-in-oil emulsion is preferably 10 to 20,000 mPas, in particular 100 to 5000 mPas. The surface tension between organic and aqueous phase is preferably in the range 0.5 to 30, in particular 0.5 to 5 mN/m. The particle size of the water emulsified in the organic phase is preferably 1 to 25 $\mu$m, in particular 1 to 10 $\mu$m and the ratio by volume of organic phase to aqueous phase is preferably in the range 70:30 to 30:70, in particular 60:40 to 40:60. The shear power is preferably $10^6$ to $10^7$ Watts per cm$^3$.

The water-in-oil emulsion to be subjected to shear by the process according to the invention may be prepared in a conventional manner, for instance by initially introducing the polymer-containing phase into a stirred container. The aqueous phase, optionally containing emulsifier, is then introduced and the mixture is emulsified in such a way that the ranges specified above for viscosity, surface tension and particle size in the water-in-oil emulsion are achieved.

The phase inversion from water-in-oil emulsion to oil-in-water emulsion is performed by passage through a suitable homogenising machine such as high-pressure homogenisers, colloid mills and toothed rim dispersers.

The water-in-oil emulsion to be subjected to shear by the process according to the invention is particularly preferably prepared by initially introducing the organic phase into a container and circulating this via a homogenising nozzle and adding the aqueous phase in a specific material stream upstream of a homogenising nozzle and thus subdividing the aqueous phase as finely as possible. During this stage enough aqueous phase is added to achieve phase inversion (batchwise process).

During continuous dispersion by the process according to the invention, dispersion is performed in such a way that the aqueous phase is added in several emulsifying steps in sequence, defined by the organic phase.

Polymers which are suitable for use in the process according to the invention are either thermoplastic polymers or elastic polymers (rubbers). The following polymers may be mentioned by way of example: polyolefins such as polyethylene, polypropylene, ethylene/α-olefin copolymers such as ethylene/propene copolymers, ethylene/butene copolymers, ethylene/pentene copolymers, ethylene/hexene copolymers, ethylene/heptene copolymers and ethylene/octene copolymers. Obviously, the corresponding isomers may also be used as parent materials for the polyolefins.

Polyisobutylenes and their secondary products such as halogenated polyisobutylene and copolymers of isobutylene and methylstyrene, isoprene and chlorinated polyethylene (CM) or chlorosulphonated polyethylene (CSM) are particularly preferably mentioned as polyolefins. In addition the following may be used as polymers: copolymers of ethylene with polar monomers such as vinyl acetate, vinyl esters, acrylates, methacrylates, maleic acid, maleic anhydride, (meth)acrylic acid, fumaric acid and their esters. The following polymers are also suitable: diene polymers such as polybutadiene, polyisoprene, polydimethylbutadiene and their copolymers with each other or with styrene or styrene derivatives, such as α-methylstyrene with acrylonitrile, methacrylonitrile with acrylates or methacrylates. The diene polymers mentioned above may also be present in the form of terpolymers or multiple copolymers. Furthermore, the following are suitable as polymers: natural rubber and its derivatives, polychloroprene and polydichlorobutadiene and their copolymers, and also styrene/butadiene block copolymers. In addition, post-treated polymers may also be used such as hydrogenated nitrile rubbers and hydrogenated styrene/butadiene block copolymers. In addition the following may be used as polymers: polyurethanes, polyesters, polyesteramides, polyethers, polycarbonates and modifications thereof.

The following are preferably used as polymers in the process according to the invention: polyisobutylenes and copolymers of isobutene and isoprene, ethylene/propylene copolymers, ethylene/propylene/diene copolymers, SBR, NBR and HNBR as well as polycarbonates and polyurethanes, in particular copolymers of isobutylene and isoprene, and their halogenated analogues (butyl rubber, halogenated butyl rubber).

The following may be mentioned as water-immiscible organic solvents in which the previously mentioned polymers are dissolved: aliphatic, aromatic, araliphatic and/or cycloaliphatic hydrocarbons.

Actual selection is made from a practical point of view. A person skilled in the art will use those solvents which enable the production of high solids concentrations at low viscosities.

It is also possible to use gases such as, for example, $CO_2$ as solvent, if they are in the supercritical state. The following are particularly preferably used as solvents: hexane, toluene, methylene chloride, benzene, chlorobenzene, methyl ethyl ketone and mixtures of these with each other.

Emulsifiers which may be used for the process according to the invention are those which are known from and conventionally used in the field of polymer dispersion. The emulsifiers are generally added to the aqueous phase. The following may be used, for example, as emulsifiers in the process according to the invention: aliphatic and/or aromatic hydrocarbons with 8 to 30 carbon atoms which have a hydrophilic terminal group such as a sulphonate, sulphate, carboxylate, phosphate or ammonium terminal group. Furthermore, non-ionic surfactants with functional groups, such as polyalcohols, polyethers and/or polyesters are suitable as emulsifiers.

In principle, any conventional industrial emulsifiers and surfactants which are suitable for stabilising oil and polymer dispersions in water may be used. The following are preferably used as emulsifiers: fatty acids salts such as the sodium and/or potassium salts of oleic acid, the corresponding salts of alkylaryl sulphonic acids, naphthyl sulphonic acid and their condensation products with, for instance, formaldehyde, and the corresponding salts of alkylsuccinic acids and alkylsulphosuccinic acids. Obviously, it is also possible to use the emulsifiers in any mixture with each other.

Choosing the appropriate, emulsifier depends in particular on the polymers to be emulsified, the solvents used and the end properties required for the dispersions prepared according to the invention.

It is important that the emulsifiers chosen are those which enable the surface tension between the organic polymer phase and the aqueous phase to be lowered sufficiently.

Emulsifiers are used in the process according to the invention, in particular, therefore, if the surface tension can be reduced to below 10 mN/m, preferably below 1 mN/m, with their assistance.

The amount of emulsifier used again depends on the criteria mentioned above and can readily be determined in an appropriate preliminary test. In this case, obviously, the amount of emulsifier used is only that which is absolutely necessary for successful performance of the process according to the invention. The amount of emulsifier is conventionally 20 to 0.1 parts by wt., in particular 10 to 0.5 parts by wt., with reference to the polymer used. Obviously, the emulsifiers may be used, as mentioned above, on their own or in a mixture with each other. The best mixing ratio again has to be determined in an appropriate preliminary test.

It is important, in the process according to the invention, that the shear process is performed with a shear power which is within the range mentioned above. If the shear power is, for instance, too low, then a stable dispersion is not obtained. If the shear power is too high, then the particle size is not within the target range required.

When the water-in-oil dispersion has been subjected to an appropriate shear process, the water-in-oil emulsion is converted into an oil-in-water emulsion. This can be recognised, inter alia, by the emulsion, which is virtually clear prior to the shear process, turning into a milky/cloudy emulsion. In addition, it is important, in the process according to the invention, that a stable water-in-oil emulsion is present, even if for only a short time, before phase inversion due to the application of a shear force.

The jet disperser preferably used here is a pressure reduction nozzle which has a much higher degree of efficiency than high-pressure homogenisers. A description of this nozzle may be found in EP 0101007. When using a homogenising pressure of only 50 bar, emulsions with the same particle size are obtained as when using a high-pressure homogeniser at 200 bar.

According to the invention, the shear process in the water-in-oil emulsion can also be performed using rotor/stator dispersing machines such as, for example, colloid mills, toothed rim dispersing machines and high-pressure homogenisers, but the jet disperser mentioned above is preferred.

The process according to the invention may be performed, as mentioned above, either batchwise or continuously. Removing the solvent used for the process according to the invention is performed in the conventional manner, for example by distillation, pressure reduction or using reverse osmosis. So-called cyclone degassing or spraying through nozzles are also suitable.

After the solvent has been removed, the dispersion is concentrated to the optimum concentration for the particular ultimate use. Known and conventional processes are used for this procedure such as distillation, ultrafiltration, centrifuging, dialysis and so-called creaming using an appropriate creaming agent, such as alginates, wherein a concentrated dispersion (cream) and an aqueous, polymer-deficient phase are formed. The latter may be recycled to the process, as the aqueous phase, optionally after adding fresh emulsifier.

Stable dispersions prepared by the process according to the invention have a polymer concentration of 10 to 70, preferably 40 to 60 wt. % (determined as proportion of solids in the dispersion).

The temperature at which the process according to the invention is performed is generally in the range 10 to 80° C., preferably 20 to 50° C. The process according to the invention may be performed either at atmospheric pressure or at elevated pressure. Elevated pressure during the process according to the invention is required only in order to feed the phases to be homogenised through the jet disperser. Homogenisation and phase inversion take place in the shear field in the nozzle.

Stable polymer dispersions with a specific polymer size range, prepared by the process according to the invention, contain only small amounts of the emulsifier used (in the range 0.1 to 10 parts by wt.) and are therefore particularly suitable for preparing high-quality dipped articles, laminates, adhesive dispersions and fabric coatings.

In comparison to the prior art, the process according to the invention is characterised in particular by the following advantages: specific particle size distribution, high solids concentrations, small amounts of emulsifier remaining in the dispersion, small amounts of equipment and energy required. Thus the process according to the invention is a cost-effective process.

The polymer particle sizes described in the examples which follow were determined using an ultracentrifuge, the viscosities of the organic phases were measured with a rotational viscometer up to a shear rate of 100 l/s, the surface tension between organic and aqueous phase was measured with an annular tensiometer and the particle size of the emulsified water in the organic phase was measured by optical microscopy.

BRIEF DESCRIPTION OF THE DRAWINGS

FIG. 5 is a sectional view of a jet disperser, according to the present invention.

EXAMPLES

Figure 1:
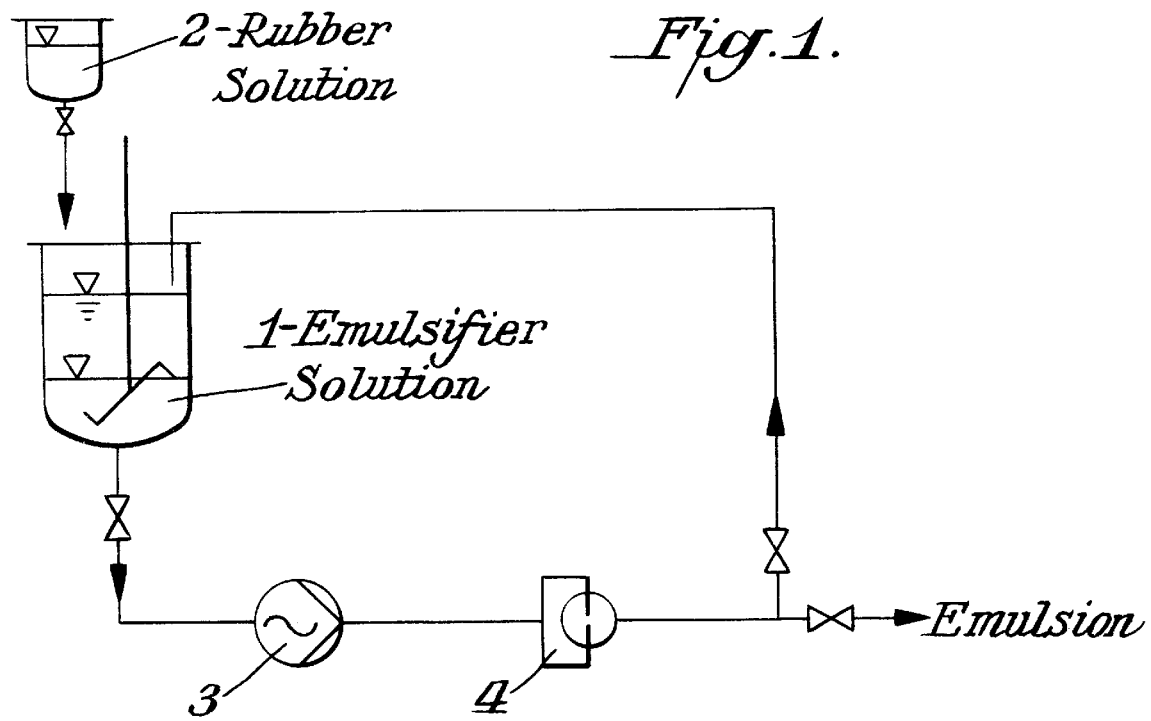
FIG. 1 is a diagramatic view of a batchwise direct dispersion process, according to the present invention.

Selecting the actual shear unit to use when performing the claimed process depends, in principle, on the practical situation. Here, a jet disperser was used as the dispersing device because finely divided dispersions can advantageously be prepared, either continuously or batchwise.

A characteristic feature of a jet disperser is that relatively well-defined shear conditions are produced. Since the process claimed here has to be performed with specific regulation of the process parameters mentioned above, the use of a jet disperser for this process is especially beneficial.

Irrespective of the type of dispersing equipment, however, a characteristic feature of the process according to the invention is that comparatively low dispersing powers are required as compared with the prior art. This is due to the fact that the phase inversion process is superior to other dispersing processes in that it enables simple production of finely divided dispersions.

Trials carried out to prepare polymer dispersions are described in the following.

Four different processes for preparing dispersions were used:

These were the direct dispersion process (not according to the invention) and the phase inversion process (according to the invention), each in a batchwise and continuous form.

The trials were performed with a jet disperser (see FIG. 5).

In the version of the trials according to the invention, a pre-emulsion 1 was pumped through nozzle holes 2 in tubular piece 4 of the jet disperser, and thus finely divided.

The emulsion 3, homogenised in this way, was discharged from the jet disperser at atmospheric pressure. In laboratory trials 1 to 19 and 37 to 41, a nozzle was used which had a nozzle body with orifices of cross-section 0.5 mm and length 0.75 mm. The number of orifices was 6.

For trials 20 to 36, a nozzle was used which had 60 orifices, each with a diameter of 0.75 mm and a length of 1.1 mm.

Example 1 not according to the invention

Preparation of a bromobutyl dispersion by means of batchwise direct dispersion (process type 1, see FIG. 1).

The following solutions were prepared: 400 g of a 19% bromobutyl rubber solution in hexane (isomeric mixture) 600 g of a 0.6% aqueous sodium dodecylbenzene sulphonate (Marlon A, Hüls AG)

The emulsifier solution is initially introduced into the stirred loop container 1.

The rubber solution is passed from container 2 with stirring into container 1 so that a fairly coarsely divided O/W emulsion was produced.

Then this pre-emulsion was circulated via jet disperser 4 by means of pressure-increasing pump 3 in order to achieve a sufficiently finely divided dispersion. The pressure across the nozzle was adjusted to 10 bar. The number of cycles was 5.

Table 1 gives, for this example and further trials, the solutions used and their concentrations, the phase ratio and the pressure across the dispersing nozzle, in addition to the polymer to be dispersed. The process was performed at RT. The geometry of the nozzle is given in FIG. 5.

A stable dispersion could not be obtained in this example. The two phases (organic and aqueous) separated again after a short time.

TABLE 1

Data for trials 1 to 19

| Process type | Ex. no. | Rubber | Conc. of org. soln. | Viscosity of org. phase [mPas] | Emulsifier Marlon/conc. in aqu. soln. | Phase ratio org./aqu. (wt. %) | Pressure bar | Energy density [J/m$^3$] | Particle size (average) μm | Surface tension [mN/m] | Comments |
|---|---|---|---|---|---|---|---|---|---|---|---|
| 1 | 1 | BIIR | 19% | 1800 | 0.6% | 40/60 | 10 | 1 × 10$^6$ | — | 2 | unstable |
| 1 | 2 | BIIR | 19% | 1800 | 0.6% | 40/60 | 50 | 5 × 10$^6$ | — | 2 | unstable |
| 2 | 3 | BIIR | 19% | 1800 | 0.6% | 40/60 | 1.5 | 1.5 × 10$^5$ | 1.9 | 2 | stable |
| 2 | 4 | BIIR | 19% | 1800 | 0.6% | 40/60 | 3 | 3 × 10$^5$ | 1.8 | 2 | stable |
| 2 | 5 | BIIR | 19% | 1800 | 0.6% | 40/60 | 8 | 8 × 10$^5$ | 1.3 | 2 | stable |
| 2 | 6 | BIIR | 19% | 1800 | 0.6% | 40/60 | 18 | 1.8 × 10$^6$ | 1.9 | 2 | stable |
| 2 | 7 | BIIR | 19% | 1800 | 1.2% | 40/60 | 1.5 | 1.5 × 10$^5$ | 1.9 | 2 | stable |
| 2 | 8 | BIIR | 19% | 1800 | 1.2% | 40/60 | 8 | 8 × 10$^5$ | 1.9 | 2 | stable |
| 2 | 9 | BIIR | 19% | 1800 | 1.2% | 40/60 | 18 | 1.8 × 10$^6$ | 0.62 | 2 | stable |
| 2 | 10 | BIIR | 15% | 1200 | 1.2% | 40/60 | 10 | 1 × 10$^6$ | 0.55 | 2 | stable |
| 2 | 11 | BIIR | 15% | 1200 | 1.2% | 70/30 | 10 | 1 × 10$^6$ | 0.55 | 2 | stable |
| 2 | 12 | BIIR | 15% | 1200 | 1.2% | 40/60 | 10 | 1 × 10$^6$ | 0.31 | 1 | stable |
| 2 | 13 | IIR | 15% | 1200 | 1.2% | 40/60 | 10 | 1 × 10$^6$ | 0.6 | 2 | stable |
| 2 | 14 | IIR | 15% | 1200 | 1.2% | 40/60 | 18.5 | 1.85 × 10$^6$ | 0.31 | 1 | stable |
| 2 | 15 | IIR | 15% | 1200 | 1.2% | 40/60 | 18.5 | 1.85 × 10$^6$ | 0.28 | 1 | stable |
| 4 | 16 | BIIR | 15% | 1200 | 1.2% | 40/60 | 20 | 2 × 10$^6$ | — | 2 | unstable |
| 4 | 17 | BIIR | 15% | 1200 | 1.2% | 40/60 | 60 | 6 × 10$^6$ | — | 2 | unstable |
| 3 | 18 | BIIR | 15% | 1200 | 1.2% | 60/40 | 24 (in 3 steps) | 8 × 10$^5$ | 0.6 | 2 | stable |
| 3 | 19 | IIR | 15% | 1200 | 1.2% | 40/60 | 24 (in 3 steps) | 8 × 10$^5$ | 1.0 | 2 | stable |

Polymers used:
BIIR: Polysar bromobutyl ×2, ML 1+8, 125° C.=46 ME, friable material, dissolved in hexane
IIR: Polysar butyl 101-3, ML 1+8, 125° C.=51 ME, friable material dissolved in hexane Example 2 not according to the invention The same procedure was used as in example 1, but the pressure across the nozzle was increased to 50 bar (see Table 1). The number of cycles was 5.

A stable dispersion could not be obtained.

Example 3 according to the invention

Figure 2:
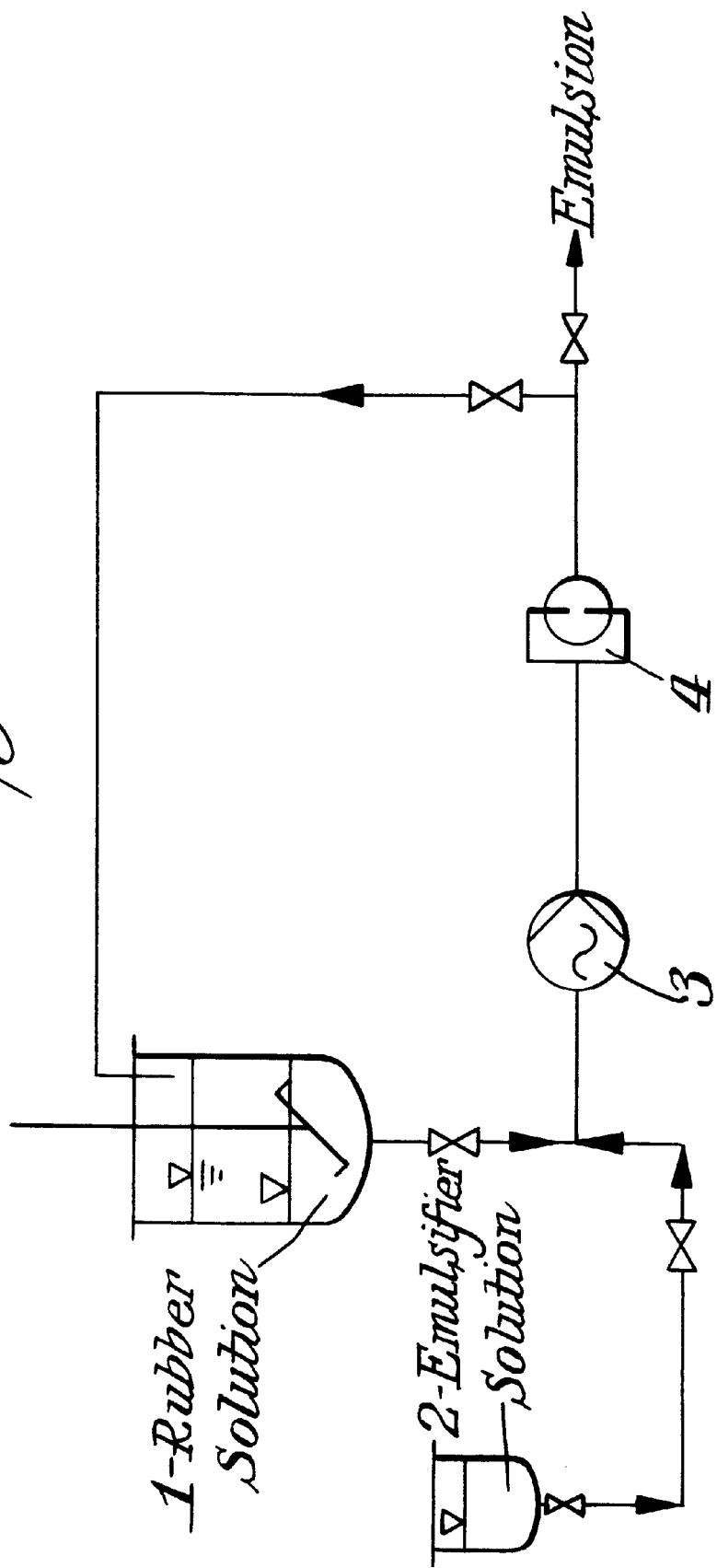
FIG. 2 is a diagramatic view of a batchwise phase inversion process, according to the present invention.

Preparation of a bromobutyl dispersion by means of a batchwise phase inversion process (see FIG. 2).

The same solutions were prepared as in example 1 (see also Table 1).

The rubber solution was initially introduced into loop container 1 and circulated through pressure-increasing pump 3 and jet disperser 4. At the same time, the emulsifier solution was removed from container 2 under suction in the approximate ratio of 1:5 (aqueous:organic) and finely homogenised. A finely divided W/O emulsion was produced first (recognisable from its transparency) which then inverted to give an O/W emulsion at a concentration of about 30 wt. % of aqueous phase. When phase inversion has been achieved, emulsion production can, in principle, be terminated. The O/W emulsion has a milky/white appearance after phase inversion.

The O/W dispersion obtained in this way had a particle size of 1–4 μm, according to optical microscopy. Before inversion, the W/O emulsion had a particle size of 1–5 μm (optical microscopy). Particle sizes within this range were also found in all the examples according to the invention.

Solvent was removed from this solvent-containing dispersion by stirring under vacuum (initially 196 mbar) at 65–75° C. and the dispersion proved to be stable.

Then the solvent-free dispersion was concentrated by adding a creaming agent.

The particle size of this emulsion was then 1.9 μm.
Process for Creaming Polymer Dispersions was Performed as Follows:

1. A 1.5% sodium alginate solution was prepared as follows: 986 g of demineralised water were initially introduced into a stirred container and heated to 80° C., then 14 g of alginate were added slowly with stirring and, after complete dissolution, allowed to cool with stirring. These alginate solutions were freshly prepared after every 3 to 4 days.
2. The dispersion was adjusted to a pH of about 8–9 with a 3% NaOH solution. Then 0.5 parts of a 1.5% strength alginate solution (Manutex, Kelco Int. Co. Ltd, London), with reference to 100 parts of polymer, were added with stirring and the mixture allowed to stand.

After 24 hours, phase separation could be observed into an upper, concentrated dispersion phase (cream) (average solids content 40–55%) and a clear to slightly cloudy, lower, serum phase which had a solids content of <1%.

It is generally advantageous to determine the optimum amount of alginate beforehand in a series of trials by varying the amount of alginate and observing the rate of separation and the separated products. It is known that too large an amount of creaming agent can have an adverse effect on the creaming procedure.

Examples 4 to 6 according to the invention

The same procedure was used as described in example 3, but different pressures were used across the dispersing nozzle (see Table 1).

In all cases, a stable dispersion was obtained, from which the solvent could be removed and which could be concentrated by creaming.

Examples 7 to 9 according to the invention The same procedure was used as described in examples 4–6, but larger amounts of emulsifier were used (see Table 1).

In all cases, a stable dispersion was obtained, from which the solvent could be removed and which could be concentrated by creaming.

The particles sizes in these dispersions were smaller than those in examples 4–6.

Examples 10 to 13 according to the invention

The same procedure was used as described in example 9, but a pressure of 10 bar was used for dispersion and the type of emulsifier was varied (see Table 1). In example 13, a butyl rubber dispersion was prepared.

In all cases, a stable dispersion was obtained, from which the solvent could be removed and which could be concentrated by creaming.

Very finely divided dispersions were obtained.

Examples 14 to 15 according to the invention

The same procedure was used as described in example 13, but a mixture of two different emulsifiers was used (see Table 1).

In all cases, a stable dispersion was obtained, from which the solvent could be removed and which could be concentrated by creaming.

Particularly finely divided dispersions were obtained.

Example 16 not according to the invention

Figure 4:
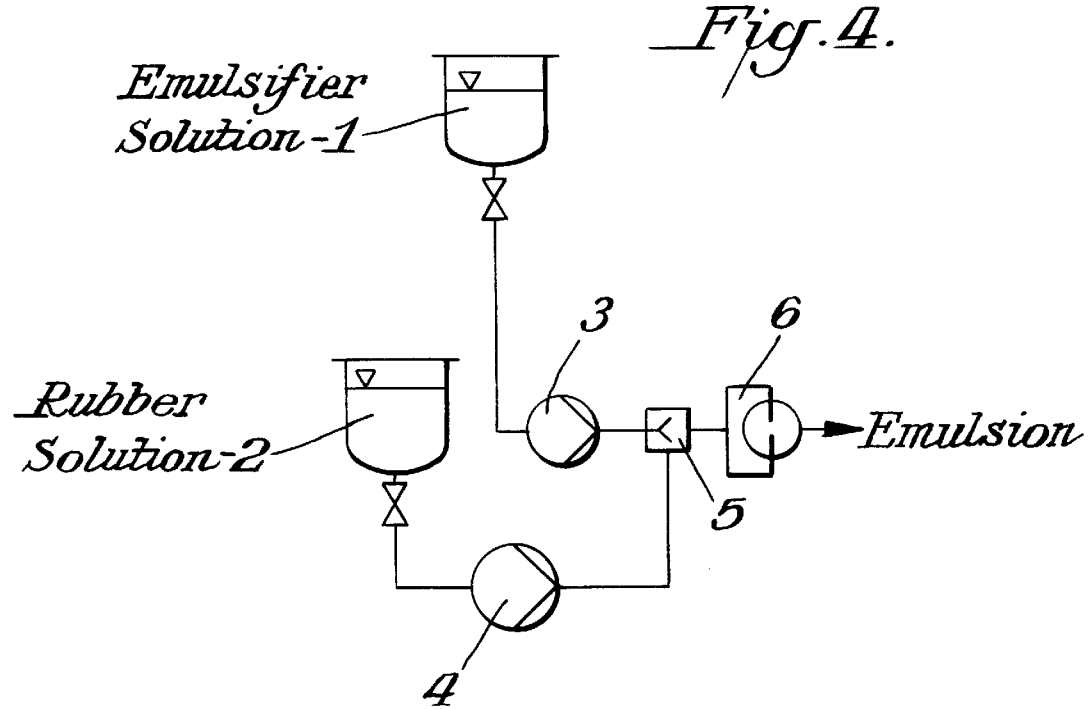
FIG. 4 is a diagramatic view of a continuous direct dispersion process, according to the present invention.

Trial to prepare bromobutyl dispersions using a continuous direct dispersion process (process 4, see FIG. 4).

The procedure was as follows: Emulsifier solution and rubber solution were withdrawn continuously and separately from storage containers 1 and 2. The increase in pressure and metering of the emulsifier solution were achieved using pumps 3 and 4. The O/W emulsion was produced in mixer 5 and this was homogenised in jet disperser 6.

An unstable dispersion was obtained which separated into two phases again within a short time of storing.

Example 17 not according to the invention

The same procedure was used as described in example 16, but the pressure across the dispersing nozzle was increased to 60 bar.

Nevertheless, stable dispersions could not be obtained.

Example 18 according to the invention

Figure 3:
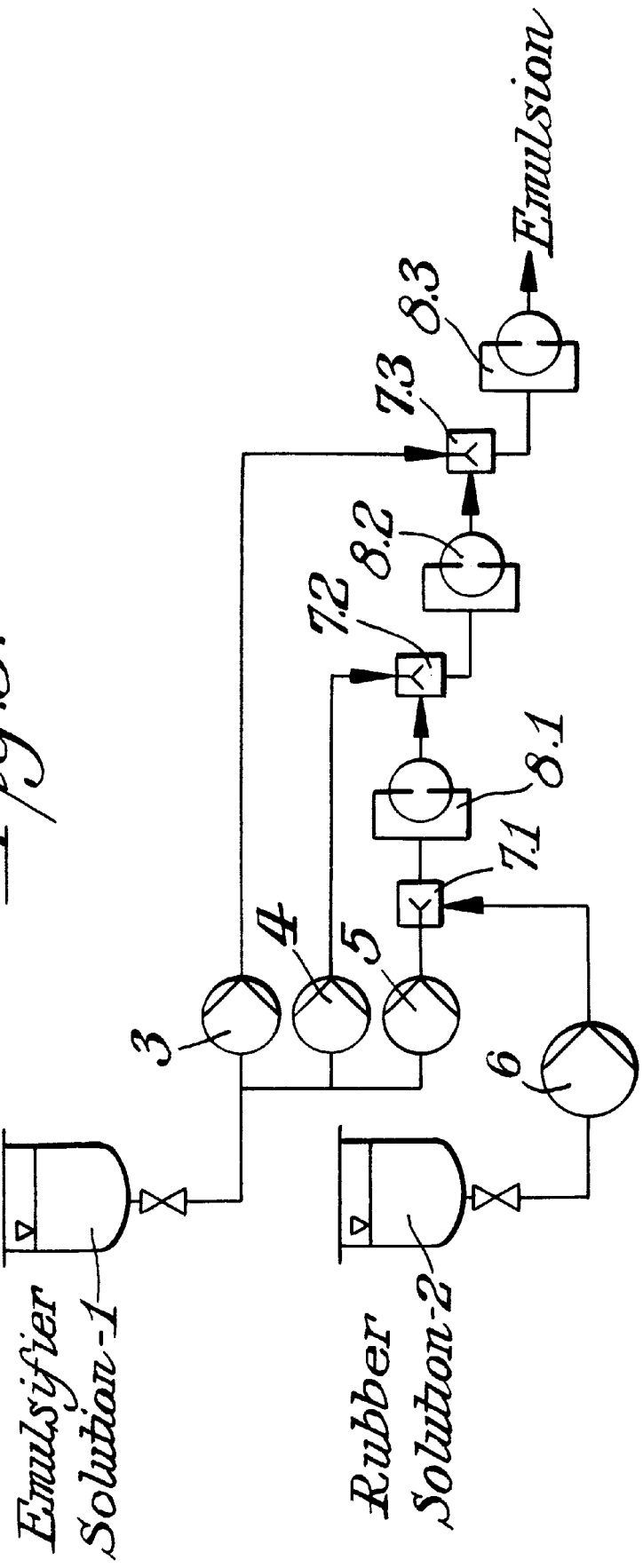
FIG. 3 is a diagramatic view of a continuous phase inversion process, according to the present invention.

Preparation of a bromobutyl dispersion by means of a continuous phase inversion process (process 3, see FIG. 3).

Emulsifier solution and rubber solution were withdrawn from storage containers 1 and 2, continuously and separately (see labels on FIG. 3). Increasing the pressure and metering the rubber solution were achieved using pump 6 in mixer 7.1, increasing the pressure and metering the emulsifier solution, divided into three substreams, into mixers 7.1, 7.2 and 7.3 was achieved with pumps 5, 4 and 3. The mixture is homogenised in mixer 7.2 by means of a jet disperser 8.1, and the mixture is homogenised in mixer 7.3 by a jet disperser 8.2. A finely divided O/W emulsion was specifically produced by using this step-wise procedure. The partial amounts of emulsifier solution were adjusted so that phase inversion took place only in jet disperser 8.3.

Three nozzles of the same structural type were used in series, wherein the pressure drop across all the nozzles was 24 bar.

A stable dispersion was obtained.

A comparison of examples 16 and 17 (both not according to the invention) with example 18 according to the invention demonstrates that it is of critical importance for successful performance of the dispersion process described here to perform controlled phase inversion of a W/O emulsion to give an O/W emulsion.

If phase inversion takes place too early or even during initial contact of the two phases, unstable dispersions only are obtained. According to the prior art, difficulties of this type are only overcome by using very high shear powers. The process used here shows that careful adjustment of the time of phase inversion enables the production of stable dispersions. During a continuous process, the physical location of the phase inversion process is important as well as the timing. Furthermore, metered addition of the phases has to be arranged in such a way that premature phase inversion, possibly due to too rapid addition of the aqueous phase, does not take place.

Example 19 according to the invention

The same procedure was used as described in example 18, but butyl rubber was dispersed.

A stable dispersion was again obtained.

Examples 20 to 36 according to the invention

Preparation of a butyl rubber dispersion by means of a batchwise phase inversion process:

| Basic formulation: | |
| --- | --- |
| Emulsifier solution: | 1.76 kg of potassium oleate |
| | 144.94 kg of fully demineralised water |
| Rubber solution: butyl | 76.8 kg of polymer solution (cement from the preparation of rubber 2030 from Bayer AG), 19.1% in hexane 21 kg of n-hexane to obtain a concentration of 15%. |

From a 400 l container, the rubber solution was circulated so that a pressure drop of 10 or 20 bar was recorded in the nozzle. The emulsifier solution is metered from the storage container into the rubber solution, wherein a ratio by volume of 1:10 (aqueous to organic phase) was maintained.

This addition procedure was terminated after a period of 45 min.

After completion of the addition procedure, the emulsifier solution was circulated in the system for another 1 hour. The emulsifying process was then complete.

Distillation was performed in a stirred tank, wherein the major quantity of hexane was first distilled off at atmospheric pressure. Towards the end of the distillation procedure, a vacuum was applied in order to remove residual amounts of hexane.

Creaming was performed in the same way as described above. The optimum amount of alginate was determined in a preliminary trial.

The dispersions listed in Table 2 were prepared using this formulation.

TABLE 2

Data for trials 20 to 36

| Example no. | Rubber | Amount/type of emulsifier | Dispersing pressure | Solids | Particle size $\mu$m | Turbidity l/g cm | Viscosity of solvent-free dispersion mPas |
|---|---|---|---|---|---|---|---|
| 20 | BIIR | 12 phr Marlon | 10 | 52.5 | | 4.9832 | 282 |
| 21 | BIIR | 12 phr Marlon | 11 | 49.9 | | 5.0522 | 283 |
| 22 | BIIR | 12 phr Marlon | 11 | 54.6 | | 5.4384 | 172 |
| 23 | BIIR | 12 phr Marlon | 10 | 40.9 | | 5.2329 | 66 |
| 24 | BIIR | 12 phr Marlon | 10 | 50.1 | | 4.5852 | 132 |
| 25 | BIIR | 12 phr Marlon | 10 | 53.1 | | 4.8262 | 9 |
| 26 | BIIR | 6 phr Marlon + 6 phr K oleate | 10 | 45.3 | | 4.0938 | 193 |
| 27 | BIIR | 12 phr K oleate | 10 | 51.9 | d10 0.1567 d50 0.4852 d90 1.3312 | 4.3126 | 293 |
| 28 | BIIR | 12 phr K oleate | 17 | 45.0 | d10 0.1021 d50 0.3747 d90 0.7854 | 2.9233 | 214 |
| 29 | BIIR | 3 phr Marlon + 3 phr K oleate | 17 | 51.2 | | 5.3292 | 136 |
| 30 | BIIR | Serum from trials 26 + 27 | 10 | 62.1 | | 4.5125 | 433 |
| 31 | BIIR | 12 phr Marlon | 10 | 50.6 | d10 0.5007 d50 1.1973 d90 5.9620 | 6.9852 | 54 |
| 32 | IIR | 12 phr Marlon | 18.5 | 50.3 | | 3.5107 | 141 |
| 33 | IIR | 6 phr Marlon + 6 phr K oleate | 18.5 | 51.6% | | 3.3316 | 70 |
| 34 | IIR | 12 phr K oleate | 18.5 | 41.7% | d10 0.2245 d50 0.5097 d90 0.9621 | 2.6175 | 74 |
| 35 | IIR | 3 phr Marlon + 3 phr K oleate | 19 | 39.7 | | 3.9795 | 85 |
| 36 | IIR | Serum | 18.5 | 43.5 | | 2.7177 | 295 |

Polymer used for trials 20 to 25:
Polysar bromobutyl 2030-1, solution in hexane, from Antwerp, concentration 18%, ML 1+8, 125° C.=34.
Viscosity of solution: 1600 mPas
Polymer used for trials 26 to 30:
Polysar bromobutyl 2030-1, solution in hexane, from Antwerp, concentration 18%, ML 1+8, 125° C.=32 ME
Viscosity of solution: 1550 mPas
Polymer used for trial 31:
Polysar bromobutyl x2, in bales from Antwerp, ML 1+8, 125° C.=46 ME
Polymer used for trials 32 to 36:
Basic polymer prior to halogenation to give bromobutyl 2030, solution in hexane, from Antwerp, concentration about 18%, ML 1+8, 125° C.=39 ME The trial parameters and results of the trials with these polymers are listed in Table 2.

These trials show that the process according to the invention can easily be performed on a larger scale.

They also show that the emulsifier-containing serum obtained during creaming can be used again for further dispersion of a polymer solution. This was surprising because the serum recycled in this way contained some creaming agent in addition to emulsifier. This amount of creaming agent did not have an adverse effect on the dispersing process. Less creaming agent was then required during the subsequent creaming procedure.

This mode of operation involving recycling the serum to the dispersion stage also meant that only enough emulsifier had to be used in the process as had been entrained in the final product.

Furthermore, this mode of operation proved that this type of process can be performed with the production of virtually no waste products.

Examples 37 to 40 according to the invention

Preparing a bromobutyl dispersion by means of a discontinuous phase inversion process, varying the dispersing pressure.

The same procedure was used as is described in example 3, but the pressure across the dispersing nozzle was varied (see Table 3).

This shows that the particle size (determined using an ultracentrifuge) is smaller the greater the pressure, as can be seen, for example, by inspecting the d10, d50 and d90 values.

TABLE 3

Values for particle size distributions for dispersions from examples 37 to 40

| Example Homogenising pressure/characteristic index for particle size | 37 1.5 bar | 38 3 bar | 39 8 bar | 40 18 bar |
|---|---|---|---|---|
| $d_0$ [$\mu$m] | 0.1322 | 0.3899 | 0.2073 | 0.1614 |
| $d_{10}$ [$\mu$m] | 0.8286 | 0.8545 | 0.4248 | 0.4247 |
| $d_{20}$ [$\mu$m] | 0.10539 | 1.0563 | 0.5920 | 0.5921 |
| $d_{30}$ [$\mu$m] | 1.2829 | 1.2635 | 0.7938 | 0.7710 |
| $d_{40}$ [$\mu$m] | 1.5653 | 1.5041 | 1.0170 | 0.9577 |
| $d_{50}$ [$\mu$m] | 1.9084 | 1.8355 | 1.2829 | 1.1460 |
| $d_{60}$ [$\mu$m] | 2.3410 | 2.2926 | 1.7149 | 1.3953 |
| $d_{70}$ [$\mu$m] | 3.0067 | 2.8621 | 2.1797 | 1.7715 |
| $d_{80}$ [$\mu$m] | 3.8633 | 3.7503 | 2.9928 | 2.2419 |
| $d_{90}$ [$\mu$m] | 5.8358 | 5.6382 | 4.0233 | 3.1052 |
| $d_{100}$ [$\mu$m] | 9.9862 | 8.1192 | 7.7883 | 5.4963 |

Example 41 according to the invention

A dispersion prepared as described in example 3 was concentrated by centrifuging instead of creaming.

For this purpose, a bromobutyl dispersion with a solids content of 12% was placed in a laboratory centrifuge and centrifuged for 10 min at 5000 rpm.

Clean separation into a cream phase with a solids content of approximately 45% and an aqueous phase was obtained.

This example demonstrates that it is possible to choose any concentrating method at all to produce the solids content required.

What is claimed is:

1. A process for preparing stable polymer dispersions with polymer particle sizes of 0.1 to 10 μm $d_{50}$ determined in an ultracentrifuge, wherein a water-in-oil emulsion, comprising a polymer dissolved in an organic solvent which is immiscible with water (organic phase) and an aqueous phase, wherein the viscosity of the organic phase is 1.0 to 20,000 mPas (measured at 25° C.), the surface tension between organic and aqueous phase is 0.01 to 30 mN/m, the particle size of the water emulsified in the organic phase is 0.2 to 50 μm and the ratio by volume of organic phase to aqueous phase is in the range 80:20 to 20:80, is subjected to a shear process at a shear power of $1\times10^3$ to $1\times10^8$ Watts per cm$^3$, wherein the water-in-oil emulsion is converted into an oil-in-water emulsion.

2. Process according to claim 1, wherein the viscosity of the organic phase is 10 to 20,000 mPas, the surface tension between the organic and aqueous phase is 0.5 to 30 mN/m, the particle size of the water emulsified in the organic phase is 1 to 25 μm and the ratio by volume of organic phase to aqueous phase is in the range 70:30 to 30:70 and the shear power is in the range $1\times10^6$ to $1\times10^7$ Watts/cm$^3$.

3. Process according to claim 1, wherein an emulsifier selected from the group consisting of sodium dodecylbenzene sulfonate, potassium oleate and a mixture thereof is present.

* * * * *